(12) United States Patent
Oliveira et al.

(10) Patent No.: US 10,832,443 B2
(45) Date of Patent: Nov. 10, 2020

(54) METHOD THAT SUPPORTS THE ANALYSIS OF DIGITAL IMAGES IN A COMPUTER CLUSTER ENVIRONMENT

(71) Applicant: FACULDADES CATÓLICAS, MANTENEDORA DA PONTIFÍCIA UNIVERSIDADE CATÓLICA DO RIO DE JANEIRO—PUC-RIO, Rio de Janeiro (BR)

(72) Inventors: Dário Augusto Borges Oliveira, Rio de Janeiro (BR); Gilson Alexandre Ostwald Pedro da Costa, Rio de Janeiro (BR)

(73) Assignee: Faculdades Católicas, Associação sem fins lucrativos, Mantenedora da Pontifícia Universidade Católica, Rio de Janeiro (BR)

( * ) Notice: Subject to any disclaimer, the term of this patent is extended or adjusted under 35 U.S.C. 154(b) by 0 days.

(21) Appl. No.: 15/580,921

(22) PCT Filed: Jun. 10, 2016

(86) PCT No.: PCT/BR2016/050134
§ 371 (c)(1),
(2) Date: Dec. 8, 2017

(87) PCT Pub. No.: WO2016/197223
PCT Pub. Date: Dec. 15, 2016

(65) Prior Publication Data
US 2018/0315212 A1    Nov. 1, 2018

Related U.S. Application Data

(60) Provisional application No. 62/173,623, filed on Jun. 10, 2015.

(51) Int. Cl.
*G06T 7/73* (2017.01)
*G06K 9/00* (2006.01)
*G06K 9/46* (2006.01)

(52) U.S. Cl.
CPC .............. *G06T 7/75* (2017.01); *G06K 9/0063* (2013.01); *G06K 9/4609* (2013.01); *G06T 7/74* (2017.01)

(58) Field of Classification Search
CPC ........... G06T 7/75; G06T 7/74; G06K 9/0063; G06K 9/4609; G06F 16/182; G06F 16/29
See application file for complete search history.

(56) References Cited

U.S. PATENT DOCUMENTS

2011/0055290 A1* 3/2011 Li ........................... G06F 16/29
707/807
2011/0316854 A1* 12/2011 Vandrovec ............ G06T 17/005
345/420

(Continued)

FOREIGN PATENT DOCUMENTS

CN            104091301 A    10/2014

OTHER PUBLICATIONS

Aji et al. "Hadoop-GIS: A High Performance Spatial Data." Proceedings VLDB Endowment, 6(11), Aug. 2013, pp. 1009-1020 (Year: 2013).*

(Continued)

*Primary Examiner* — Jon Chang
(74) *Attorney, Agent, or Firm* — Laurence P. Colton; Smith Tempel Blaha LLC

(57) ABSTRACT

Methods that support the analysis of digital images through the distributed and integrated processing of raster and vector digital data in a computer cluster environment, the set of methods including a particular strategy for distributing the processing of spatial context-aware operations over distrib- (Continued)

uted datasets, as well as specific methods for the structuring of operations aimed at calculating spectral and topological properties of image objects, and for the resolution of spatial conflicts among objects.

8 Claims, 2 Drawing Sheets

(56) References Cited

U.S. PATENT DOCUMENTS

2012/0254193 A1    10/2012  Chattopadhyay
2016/0124992 A1*   5/2016   Alesiani ............... G06F 9/5033
                                                          707/737

OTHER PUBLICATIONS

Liu et al. "A MapReduce Approach for Processing Large-scale Remote Sensing Images." 20th International Conference on Geoinformatics, Jun. 15, 2012, 7 pages (Year: 2012).*
Lin et al. "The Framework of Cloud Computing Platform for Massive Remote Sensing Images." IEEE 27th International Conference on Advanced Information Networking and Applications, Mar. 25, 2013, pp. 621-628 (Year: 2013).*
WIPO, International Search Report (on priority application), dated Oct. 19, 2016.

* cited by examiner

METHOD THAT SUPPORTS THE ANALYSIS OF DIGITAL IMAGES IN A COMPUTER CLUSTER ENVIRONMENT

FIELD OF THE INVENTION

The present invention relates to methods that support object-based analysis of digital images through the distributed and integrated processing of raster and vector digital data in a computer cluster environment.

BACKGROUND OF THE INVENTION

Driven by the increasing volume of available digital image data, different solutions have been recently proposed, aiming at improving image processing applications. Some of those solutions consist of distributed systems for spatial operations and raster processing, being most of them based on MapReduce technology and on its open-source implementation: the Apache Hadoop. The Hadoop Image Processing Interface (HIPI), for instance, provides an extensible library for image processing over a distributed MapReduce framework. HIPI is, however, not spatially aware, and therefore, not appropriate to handle georeferenced images.

Regarding spatial data management and processing, a few works have proposed techniques for storing and querying large datasets with the aid of efficient spatial indexes. Systems such as Hadoop-GIS and SpatialHadoop offer spatial data storage and spatial query execution over vector data, but they do not contain functions for computing properties of spatial objects (delimited through vectors/polygons) based on the corresponding image (raster) pixels' values. Currently, therefore, there is a lack of solutions that deal with both the raster and the vector domains.

The porting of AEGIS to the Hadoop framework presents an attempt to fill this gap; however, the system still does not support vector data processing in a distributed environment.

The document US2012254193 (A1) reveals an application of MapReduce technology that is used as a way for simplifying large-scale data processing.

In conclusion, the search of the literature revealed no documents that anticipate or suggest the teachings of the present invention, so the set of methods now proposed bears novelty and inventive activity, in the eyes of the inventors, in light of the state of the art.

BRIEF SUMMARY OF THE INVENTION

In a first aspect, the present invention comprises a set of methods that support object-based distributed analysis of digital images in a cluster of computers.

In a second aspect, the methods described are based on the processing of parts of images (image tiles) and indexed image objects (delimited through vectors/polygons) through a regular grid of cells associated with a same reference coordinate system.

In a third aspect, the set of methods prescribe the partial computation of the results of a spatial operation on the individual processing and storage units of a cluster of computers, as well as the integration of the results of the spatial operation, as if the results were generated by a single processing unit.

In a fourth aspect, the methods described in this invention enable the distributed execution of spatial operations associated with the computation of spectral and topological properties of objects, as well as the resolution of spatial conflicts between objects.

BRIEF DESCRIPTION OF THE DRAWINGS

The set of methods that support object-based analysis of digital images through the distributed and integrated processing of raster and vector digital data in a computer cluster environment according to the present invention shall be well understood from the illustrative appended figures, which, in a schematic way and not limiting the scope, represent.

DETAILED DESCRIPTION OF THE INVENTION

Figure 1A:
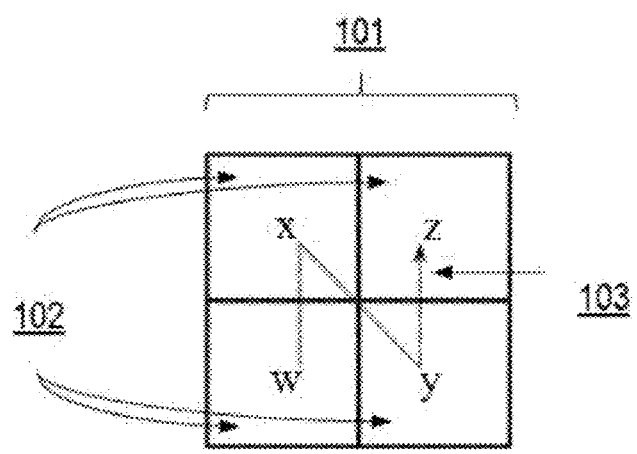
FIG. 1—Method for associating image objects (101) with geo-cells (102) by multiple assignment.

The description that follows uses examples from a particular application of the methods, namely the interpretation of digital images acquired through remote sensing systems, such as earth observation orbital or aerial systems. The applications of the methods are, however, not restricted to the remote sensing field, as they can be used in the analysis of any digital image produced through different imaging technologies, in the context of a variety of fields such as: radiography; magnetic resonance imaging; medical ultrasonography; microscopy; astrophotography, among others. The examples and figures shown herein are solely intended to exemplify one of the innumerous manners of carrying out the invention, not limiting the scope thereof.

For the purposes of the present invention and before the actual description, some terms used herein must be explained.

The term "raster image" is understood as a dot matrix digital data structure representing a grid of pixels. The expression "vector data" is understood as a digital data structure that encodes a set of vertices, which define the borders of polygonal areas. The expression "image tile" is understood as a rectangular subset of a raster image.

The term "image segment" is understood as a polygonal area within a raster image, determined by a set of vertices that define the borders of the polygonal area. The vertices are defined by coordinates in a coordinate reference system by which the pixels in the raster image can also be determined. The coordinates of all vertices of an image segment are encoded in a digital data structure.

The term "image object" is understood as an image segment plus any digitally encoded information associated to the image segment, especially but without limitation, to properties of the image segment. Examples of such properties include, but are not limited to, classification assignments and membership values, morphological measures, topological relationships among segments, any kind of measure computed on the set of pixels of a raster image that overlaps the corresponding image segment.

The term "operation" is understood as a computerized procedure which may have as inputs a set of image tiles and a set of image objects, and which may have as outputs a set of measures associated with image object properties or a set of new image objects, associated with new segments generated by the procedure.

In a preferred embodiment of this invention, the user of a computer system that relies on the methods provided by this invention may define one or more operations to be executed in a computer cluster. The set of methods that are objects of this invention supports the partial computation of an operation over the individual processing and storage units of a computer cluster, as well as the integration of the results of the operation, as if the final results were generated by a single computer.

The methods provided by the present invention rely on indexing of image tiles and image objects through labels that identify the cells of a regular grid of cells that overlaps one or more digital images. The relative position of the cell grid is defined based on a reference coordinate system that can be independent of the boundaries of the images.

In a preferred embodiment of the present invention, a computer system which is based on the described methods is executed in a computer cluster equipped with a distributed file system and a distributed processing system. The computer system creates a set of image tiles through the division of input images according to the geo-cell grid. The image tiles can be distributed to the cluster nodes according to the particular policies of the distributed file system or, alternatively, be stored on a single storage device in the cluster. In any case, image tiles are retrieved on demand whenever pixel intensity information (also called spectral information) is required for an operation. Image objects can be stored in the distributed file system and thus distributed and replicated in the cluster according to distributed file system policies.

Figure 1B:
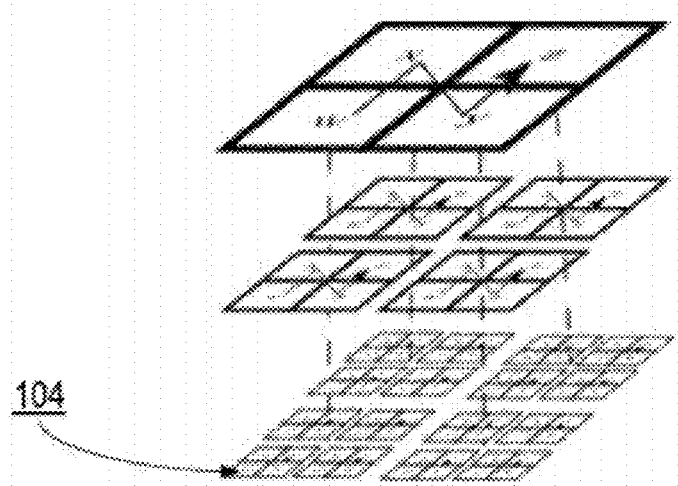

Referring in part to FIG. 1, the present invention is based on a technique for associating image objects (101) with geo-cells (102). As an image object can spatially overlap more than one geo-cell, the association is made through multiple assignment, where an object (101) is associated with all the overlapping geo-cells (102).

One of the objects of the present invention is a method that supports the distributed processing of a spatial operation across the processing units of a computer cluster. The method is based on a processing strategy that considers the spatial locale of image tiles and objects, called "spatial-aware with replication distributed processing strategy", described below.

In the spatial-aware with replication distributed processing strategy image objects are first grouped according to the geo-cell they overlap. Image objects that overlap more than one geo-cell are replicated taking into account all intercepted geo-cells, consisting of a multiple assignment, shown in FIG. 1. All objects in a group are then stored on a single cluster node. The strategy has six steps:

i. Intersecting geo-cells identification: Each image object gets a list with all the geo-cells they overlap. The geo-cell with the lowest label is assigned as the original geo-cell.

ii. Object replication: The image objects are replicated according to the geo-cell they overlap. The same object id property value is attributed to all copies of the same object.

iii. Object grouping by geo-cell: All image objects with the same object id property value are stored in a single computer cluster node.

iv. Partial results computation: For each geo-cell, the image tile that overlaps that geo-cell is loaded in a computer cluster node. Then the computation of the operation is performed for each image object considering only the intersection between the image object and the loaded image tile. We say the computation delivers partial results, because one image object may overlap more than one image tile.

v. Object grouping by original geo-cell: All image objects are grouped by their original geo-cell. All the objects of a group are then stored in a single computer cluster node.

vi. Partial results reduction: The partial results of the image objects with the same object id are combined to produce the final results of the operation, and all replicated objects are deleted.

Objects of the present invention are three methods that support the creation of classes of operations that are based on the spatial-aware with replication distributed processing strategy, namely: calculation of spectral measurements; calculation of topological measurements; and resolution of spatial conflicts. These three operations are explained below, focusing on their differences with respect to the partial results computation (step iv) and partial results reduction (step vi) steps.

Computation of Spectral Measurements

After the image objects are grouped by geo-cell in step iii, the corresponding image tile is loaded and the partial values for all the required spectral features are computed. If the image object overlaps other tiles, only the intersection with the current tile is considered. After the partial values are computed, they are stored as an object property.

After the objects are regrouped by original geo-cell (step v), all objects with the same object id are grouped. These objects represent the copies of the same object that have been created in the replication step (step ii). Once the copies are gathered, partial values are combined and the final feature value is stored in the corresponding property field of the original object. After that, all copies of the original object, but the original object itself are deleted. Examples of spectral features are: mean values per band; maximum pixel value; minimum pixel value; band ratio; brightness; band mean arithmetic expressions; amplitude value; standard deviation; and texture measures.

Spatial Conflict Resolution

Figure 2A:
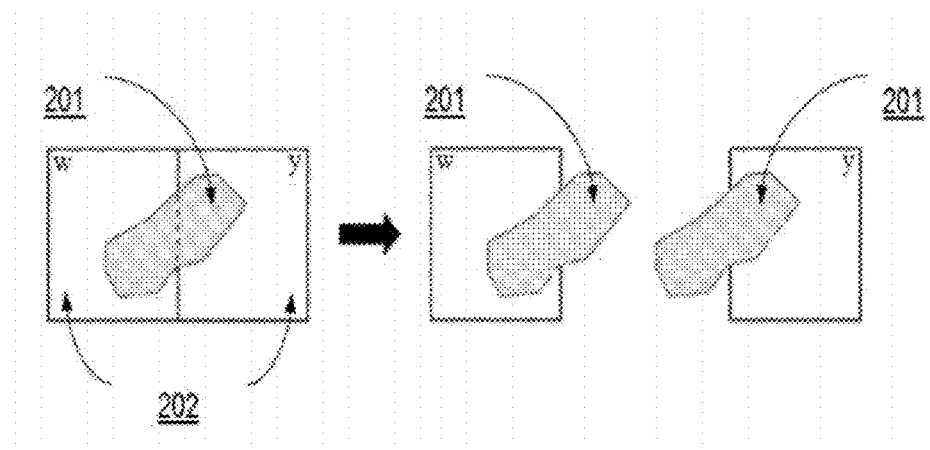
FIG. 2—Method for spatial conflict resolution: image objects (201) and (202) are sorted ascendingly by the value of some property and inserted into a list; each object from the list is rasterized (203) in an auxiliary raster (204) in ascending order of the property value. Subsequently, a vectorization process (205) determines the final shapes of the image objects (206), (207) and (208).
Figure 2B:
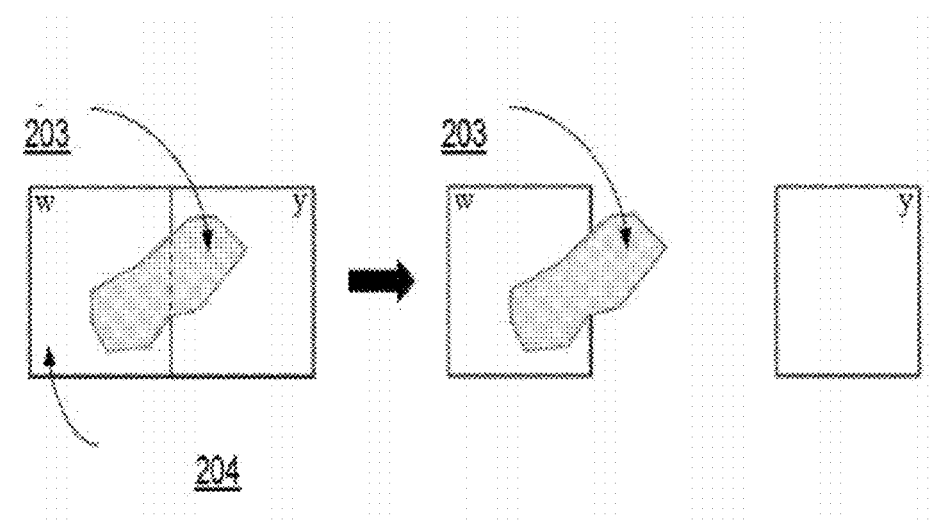

This class of operations resolves spatial overlaps among image objects. Referring in part to FIG. 2, image objects (201) and (202) are ordered ascendingly by according to some property value, such as a class membership value, and inserted into a list. After that, the objects in this list are rasterized (203) in an auxiliary raster image, that is, the pixels of the auxiliary raster which are overlapped by the segment associated with the object receive a value that identifies the object. The objects in the list are rasterized in ascending order of the property value, so that the value of a given pixel is changed for each object in the list that spatially intercepts it. After all objects in the list are rasterized, a vectorization process (205) determines the final shapes of the image objects (206), (207) and (208); the polygon area associated with each object in the list is determined from the auxiliary raster pixels that have the value of the object's id, and the vertices of the corresponding segments are rectified. It should be noted that in the vectorization process some of the objects in the list may have their spatial extent reduced partially or totally, in which case the corresponding objects are discarded.

During spatial conflict resolution, some image objects may be completely discarded. The remaining image objects may keep their original shapes, have their areas reduced or even divided in two or more objects.

After the image objects belonging to the same geo-cell are grouped in step iii, they undergo the aforementioned ordering and rasterization process. If an image object intersects more than one geo-cell, only the intersection with the current geo-cell is considered.

After the image objects are regrouped by original geo-cell (step vi), the ones with the same object id are gathered. These image objects are the copies of the same image object that have been created in the replication step (step ii). However, some copies may have been discarded, have their areas reduced, or divided in two or more image objects during the rasterization process. These copies are merged and new image objects are created for the disjoint parts. In the end, all image objects receive new object ids and have their properties reset.

Computation of Topological Measures

Figure 3:
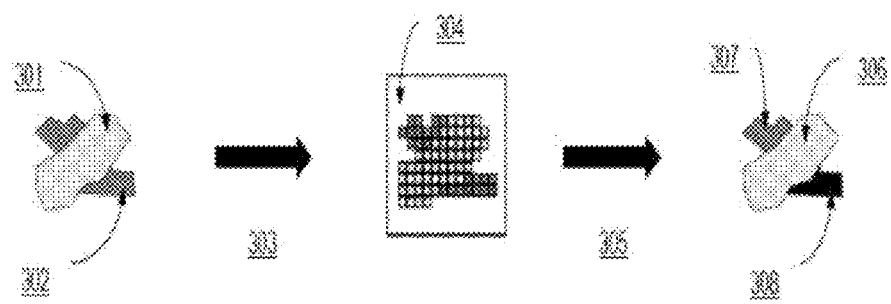
FIG. 3—Method for distributed computation of topological properties: after grouping objects by geo-cell, for each image object (301) neighboring objects (302) are identified; a partial topological property value is computed if both objects of a neighboring pair of objects have the same original geo-cell, which prevents considering more than once objects that intersect more than one geo-cell (303) in the calculation of the final topological property value.

Topological measures are calculated based on the neighborhood relations among image objects. Referring in part to FIG. 3, after the objects are grouped by geo-cell (step iii), for each target image object (301), the neighboring objects (302) are checked by querying a spatial index. Then a list of all the geo-cells that overlap each target-neighbor pair of objects is created.

Partial topological measurements are only computed if both image objects have the same original geo-cell. This prevents a topological measure from being computed more than once for image objects intercepting more than one geo-cell (303), referring in part to FIG. 3. When all partial values are calculated, they are stored as a property value of the corresponding objects.

In the partial results reducing step (step vi), all image objects with the same id are grouped together. They represent the copies that were created in the replication step (step ii). Once the copies are grouped, partial result values are combined and the resulting value is stored as a property of the original image object. After that, all copies of the original object, but the original object itself, are deleted. Examples of topological measures are: number of neighbors of a specific class; extension of the boundary with neighboring objects of certain classes, relative area of neighboring objects of certain classes.

The invention claimed is:

1. A method for the distributed execution of an operation that computes spectral properties of image objects, which utilizes, as a distributed processing strategy, a spatial-aware with replication strategy having a partial results computation, wherein the computation of the partial results of the spatial-aware with replication strategy comprises accessing an image tile that overlaps a geo-cell, for each geo-cell, computing a value of a spectral property for each image object that overlaps the image tile considering only the pixels of the image tile that intersects the image object, and storing the computed value of the spectral property for the image object.

2. The method of claim 1, wherein in a reduction of the partial results step of the spatial-aware with replication strategy, the image objects with the same id are grouped, and the values of the spectral property stored for each of the image objects in a group are combined into a final value, and the final value is then stored for one of the image objects in that group, and all other image objects in that group are deleted.

3. A method for the distributed execution of an operation that performs spatial conflict resolution among image objects, which utilizes, as a distributed processing strategy, a spatial-aware with replication strategy having a partial results reduction step, wherein after the partial results reduction step of the spatial-aware with replication strategy, the image objects are sorted in ascending order, by the value of some stored property of the image objects, and inserted into a list.

4. The method of claim 3, wherein after the image objects are sorted in ascending order by the stored property value of the image objects and inserted into the list, each of the image objects in the list is rasterized onto an auxiliary digital raster in ascending order of the stored property value, and after rasterization a vectorization process is used to determine new extents of the image objects.

5. The method of claim 4, wherein after the vectorization process, the extents of the image objects with the same id are merged, and new image objects are created for disjoint parts of the merged extents.

6. A method for the distributed execution of an operation that compute topological properties of image objects, which utilizes, as a distributed processing strategy, a spatial-aware with replication strategy having a partial results computation, wherein the computation of the partial results of the spatial-aware with replication strategy comprises identifying all pairs of neighboring image objects, and creating a list with all geo-cells that overlap each of the pairs of neighboring image objects.

7. The method of claim 6, wherein in the computation of the partial results step of the spatial-aware with replication strategy, a partial value of a topological property considering a neighboring pair of image objects is computed and stored for the image objects in the pair only if the geo-cells with the lowest label, from those of the geo-cells that overlap each of the image objects in the pair, have the same label.

8. The method of claim 7, wherein in the partial results reduction step of the spatial-aware with replication strategy, all of the image objects with the same id are grouped and the partial value of the topological property stored for each of the image objects in a group are combined into a final value, and the final value is then stored for one of the image objects in that group, and all other image objects in that group are deleted.

* * * * *

UNITED STATES PATENT AND TRADEMARK OFFICE
CERTIFICATE OF CORRECTION

PATENT NO. : 10,832,443 B2  
APPLICATION NO. : 15/580921  
DATED : November 10, 2020  
INVENTOR(S) : Bentes et al.

Page 1 of 1

It is certified that error appears in the above-identified patent and that said Letters Patent is hereby corrected as shown below:

On the Title Page

Item (12), should read:  
Bentes et al.

Item (72), should read:  
(72) Inventors: Cristiana Barbosa Bentes, Niterói (BR); Dário Augusto Borges Oliveira, Rio de Janeiro (BR); Gilson Alexandre Ostwald Pedro da Costa, Rio de Janeiro (BR); Patrick Nigri Happ, Rio de Janeiro (BR); Raul Queiroz Feitosa, Rio de Janeiro (BR); Rodrigo da Silva Ferreira, Nova Iguaçu (BR)

Signed and Sealed this  
Seventeenth Day of December, 2024

Derrick Brent  
*Acting Director of the United States Patent and Trademark Office*